United States Patent
Pyo (10) Patent No.: US 7,845,050 B2
(45) Date of Patent: Dec. 7, 2010

(54) DEVICE FOR BUFFERING THE CLOSING IMPACT OF FURNITURE DOORS

(75) Inventor: Chul Soo Pyo, Seoul (KR)

(73) Assignee: Samsung Precision Industrial Co., Ltd., Incheon (KR)

( * ) Notice: Subject to any disclaimer, the term of this patent is extended or adjusted under 35 U.S.C. 154(b) by 0 days.

(21) Appl. No.: 12/293,783

(22) PCT Filed: Jul. 18, 2007

(86) PCT No.: PCT/KR2007/003459

§ 371 (c)(1),
(2), (4) Date: Jul. 12, 2009

(87) PCT Pub. No.: WO2008/010664

PCT Pub. Date: Jan. 24, 2008

(65) Prior Publication Data

US 2010/0162521 A1  Jul. 1, 2010

(30) Foreign Application Priority Data

Jul. 18, 2006  (KR) .................. 10-2006-0066882

(51) Int. Cl.
*E05F 5/06* (2006.01)
(52) U.S. Cl. .............................. 16/85; 16/82
(58) Field of Classification Search .......... 16/82, 16/85, 86 A, 66, 69, 70, 71; 292/215.5, 70, 292/76, 341.12, DIG. 15, DIG. 19; 188/316, 188/318, 322.15, 322.19, 322.5, 289, 882.8
See application file for complete search history.

(56) References Cited

U.S. PATENT DOCUMENTS 1,576,286 A * 3/1926 Lang ........................... 16/51
1,816,024 A * 7/1931 Petersen ....................... 16/85
2,953,810 A * 9/1960 Hall ............................. 16/52
3,376,088 A * 4/1968 Bol et al. ..................... 292/353
4,110,868 A * 9/1978 Imazaike ...................... 16/84
4,452,437 A * 6/1984 Lochner .................. 267/64.22
4,601,502 A * 7/1986 Van Dyke .................. 292/252
4,686,740 A * 8/1987 Ishii ............................. 16/85

(Continued)

FOREIGN PATENT DOCUMENTS

KR  20-0271109  4/2002

(Continued)

*Primary Examiner*—Chuck Y. Mah
(74) *Attorney, Agent, or Firm*—Haynes and Boone, LLP (57) ABSTRACT

A device for buffering the closing impact of furniture doors is disclosed. A valve (40) is mounted around a piston rob (23) of a piston (20) in such a fashion that an oil gap (41) is defined between the outer peripheral surface of the valve (40) and the inner peripheral surface of a cylinder (10), the valve having a recessed oil passageway (47) formed on an axial end surface. A protrusion element (50) has a plurality of oil grooves (51) A check valve (60) slides reciprocally along the compression direction of oil. When an external load is exerted to the piston (20), a check valve (60) moves along with the protrusion element (50) and simultaneously oil contained in the oil chamber (11) flows through the recessed oil passageway (47) via the oil grooves (51) defined between the protrusion element (50) to absorb an impact generated during the closing of the furniture door.

3 Claims, 5 Drawing Sheets

U.S. PATENT DOCUMENTS

| | | | |
|---|---|---|---|
| 4,817,238 A * | 4/1989 | Liu | 16/66 |
| 4,817,898 A * | 4/1989 | Locher | 248/161 |
| 4,946,008 A * | 8/1990 | Bauer et al. | 188/129 |
| 4,948,103 A * | 8/1990 | Bowden et al. | 267/34 |
| 5,579,874 A * | 12/1996 | Jeffries et al. | 188/282.9 |
| 6,615,450 B2 | 9/2003 | Salice | |
| 6,802,408 B2 | 10/2004 | Krammer | |
| 2005/0269176 A1 | 12/2005 | Tomiji et al. | |

FOREIGN PATENT DOCUMENTS

| | | |
|---|---|---|
| KR | 20-0328303 | 4/2002 |
| KR | 20-0328303 | 9/2003 |
| KR | 10-2006-0061891 | 6/2006 |
| WO | WO 2006/059860 | 6/2006 |
| WO | WO 2006059860 | 6/2006 |

* cited by examiner

DEVICE FOR BUFFERING THE CLOSING IMPACT OF FURNITURE DOORS

TECHNICAL FIELD

The present invention relates to a door buffering device which is installed at a path where a door for furniture or sinks is opened/closed, and more particularly, to a device for buffering the closing impact of furniture doors, in which a dual oil passageway is formed so as to prevent noise from being generated during the closing of the door and lengthen the lifespan of the furniture.

BACKGROUND ART

In general, one or a pair of doors is mounted at furniture such as sinks, drawers or the like in such a manner as to pivotally rotate about a hinge shaft. A fluid damper is mounted on the inner wall or the front side of the furniture so as to absorb the impact generated in the course of closing the door to minimize noise due to the impact and lengthen the lifespan of the furniture.

Figure 1:
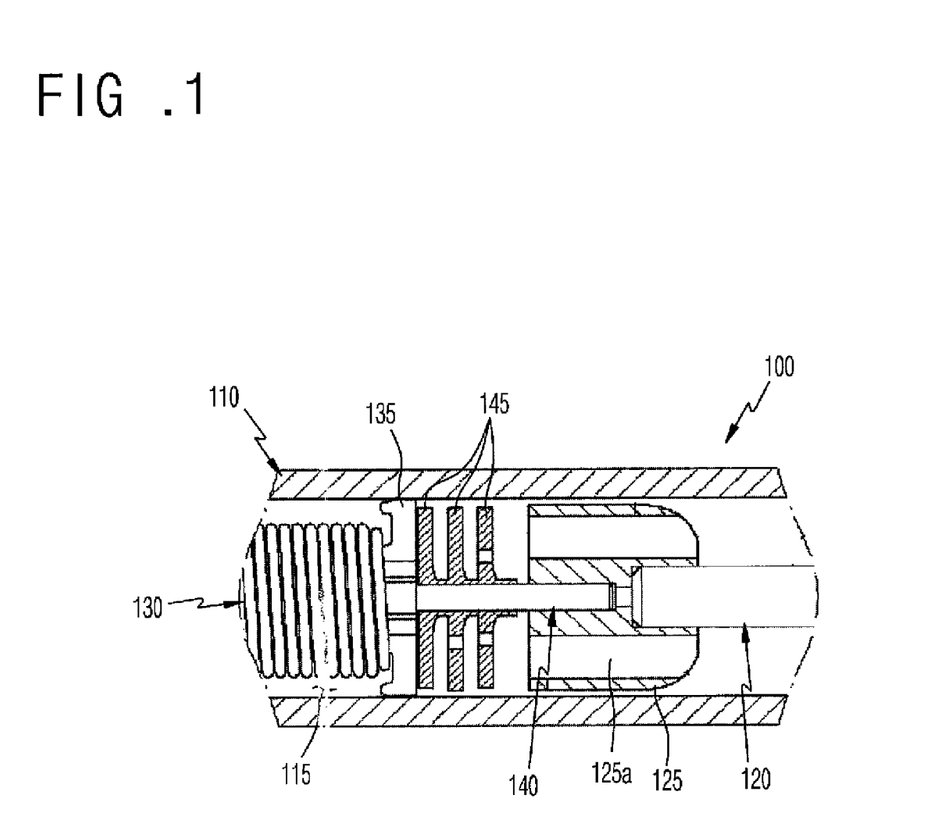
FIG. 1 is a partial sectional view illustrating a door buffering device (i.e., fluid damper) which is in operation according to the prior art.

That is, as shown in FIG. 1, U.S. Pat. No. 6,802,408 discloses a fluid damper 100 including a cylinder 110 having an oil chamber 115, a piston 120 accommodated in the oil chamber 115 and having a pressurizing bracket 125 provided at the tip thereof, a spring 130 accommodated in the oil chamber 115 and having a guide 135 mounted at a front portion thereof, a linkage bar 140 for interconnecting the pressuring bracket 125 and the guide 135, and a plurality of movable ring disks 145 arranged on the outer circumferential surface of the linkage bar 140.

Thus, when an external force is exerted to the fluid damper 100, three ring disks 145 come into close contact with the bracket 125 while being sequentially bent back to move closer together as much as a pressure corresponding to the external force applied to the piston 120 in the forward direction of the movement of the piston 120, and hence oil in the cylinder 100 flows through oil holes formed in the ring disks 145 and openings 125a formed in the bracket 125 to thereby perform a buffer action.

On the contrary, when the external force exerted to the fluid damper 100 is released, the ring disks 145 return to their original positions by an elastic restoring force of the spring. Then, oil in the cylinder 110 flows through a space formed between the outer circumferential surfaces of the ring disks 145 and the inner wall of the cylinder 110 via the openings 125a of the bracket 125. As a result, the ring disks 145 sealingly block the flow path However, in the process where the external force exerted to the fluid damper 100 is released and the ring disks 145 return to their original positions, oil is allowed to flow only through the outside of the ring disks 145, i.e., a gap formed between the inner wall of the cylinder 110 and the outer circumferential surfaces of the bracket 125, and hence an increased elastic force of the spring 130 is required to improve the returning force and the buffering force of the piston 120.

For this reason, if the elastic force of the spring 130 in the fluid damper 100 is increased, for example, the fluid damper can be used for a large or heavy door. But, in case of a small or light door, the restoring force of the spring 130 is greatly exerted, and so the door is closed with it widened by a certain aperture angle, resulting in a degradation of the sense of beauty of the outer appearance of the furniture.

Furthermore, the elastic force of the spring 130 is required to be reduced in order to overcome the aforementioned shortcoming of the fluid damper 100 and the cylinder 110 is required to be constructed larger than the bracket 125 in order for the piston 120 to be rapidly returned to its original position. Therefore, there occurs a problem in that a load applied to the fluid damper is not suitably absorbed.

Meanwhile, conventional products such as the fluid damper 100 have been proposed in which a buffer spring is interposed between the piston 120 and the bracket 125 to improve the operation capability of the piston. However, the conventional products entail a problem in that the manufacturing cost and assembling cost of the buffer spring are incurred additionally, thereby increasing the product price.

DISCLOSURE OF INVENTION

Technical Problem

Accordingly, the present invention has been made in an effort to solve the aforementioned problems occurring in the prior art, and it is an object of the present invention to provide a device for buffering the closing impact of furniture doors, in which a dual oil passageway is formed so as to prevent noise from being generated during the closing of the door and lengthen the lifespan of the furniture.

Technical Solution

To accomplish the above object, according to the present invention, there is provided a device for buffering the closing impact of furniture doors, the device comprising: a cylinder having an oil chamber formed therein; a piston reciprocatingly accommodated in the oil chamber and having a piston rod projecting at one side thereof through an end wall of the cylinder, the piston rod being adapted to reciprocate in the oil chamber while passing through a sealing member and a buffer member; a spring accommodated in the oil chamber and having a guide mounted at a front end thereof; a valve including a body portion and a protrusion element, the body portion being mounted around the piston rod of the piston in such a fashion that an oil gap is defined between the outer peripheral surface of the body portion and the inner peripheral surface of the cylinder and having a recessed oil passageway formed on an axial end surface thereof, and the protrusion element being integrally formed with a front end side of the body portion and having a plurality of oil grooves formed longitudinally on the outer periphery thereof; and a check valve mounted on the outer circumferential surface of the protrusion element in such a fashion as to slidingly reciprocate along the compression direction of oil, whereby oil contained in the oil chamber flows through the oil grooves and then passes through the recessed oil passageway of the valve and the oil gap so as to absorb an external load generated during the closing of the furniture door.

Advantageous Effects

According to the device for buffering the closing impact of furniture doors of the present invention, a door buffering device having a dual oil passageway is mounted in an opening/closing path of a furniture door so that a collision noise generated during the closing of the door is minimized to create a noiseless indoor environment as well as secure stability at the time of closing the door, thereby lengthening the lifespan of the furniture and the door buffering device.

In addition, according to the device for buffering the closing impact of furniture doors of the present invention, a door buffering device having a single spring is mounted in the opening/closing path of the furniture door so that the number of constitutional parts of the door buffering device is minimized, the manufacturing cost is reduced, and reliability of the product is improved.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Reference will now be made in detail to the preferred embodiment of the present invention with reference to the attached drawings.

Embodiment 1

Figure 2:
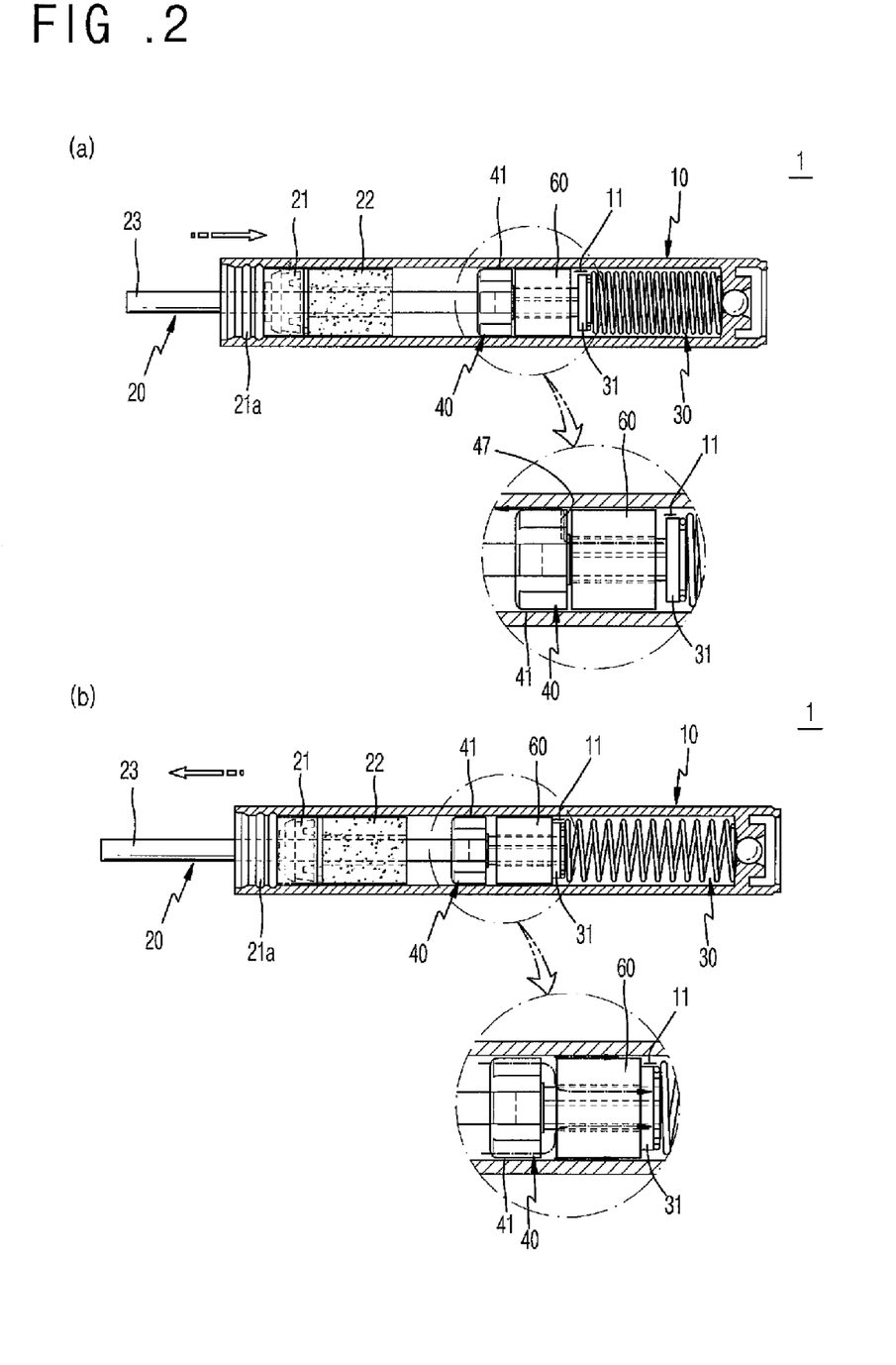
FIGS. 2a and 2b are sectional views illustrating a door buffering device according to a first embodiment of the present invention.
Figure 5:
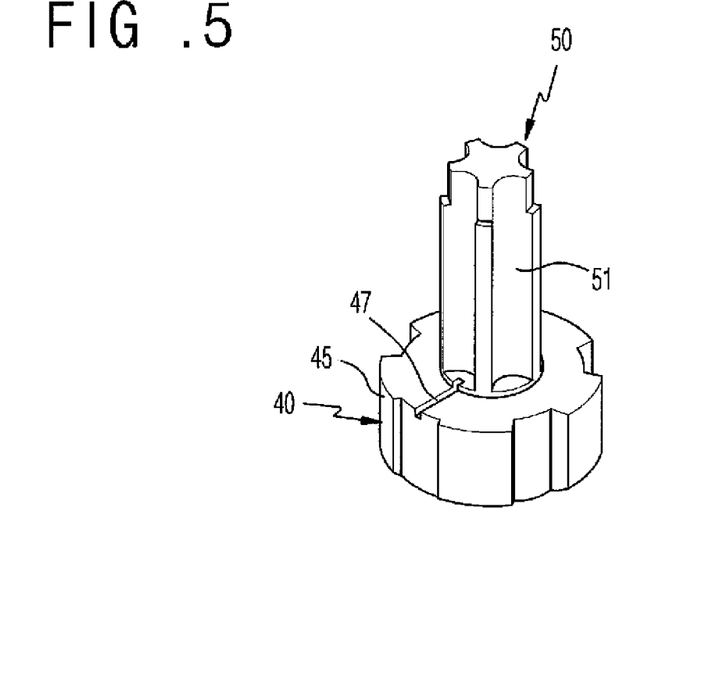
FIG. 5 is a perspective view illustrating a protrusion element of a door buffering device according to the present invention.
Figure 6:
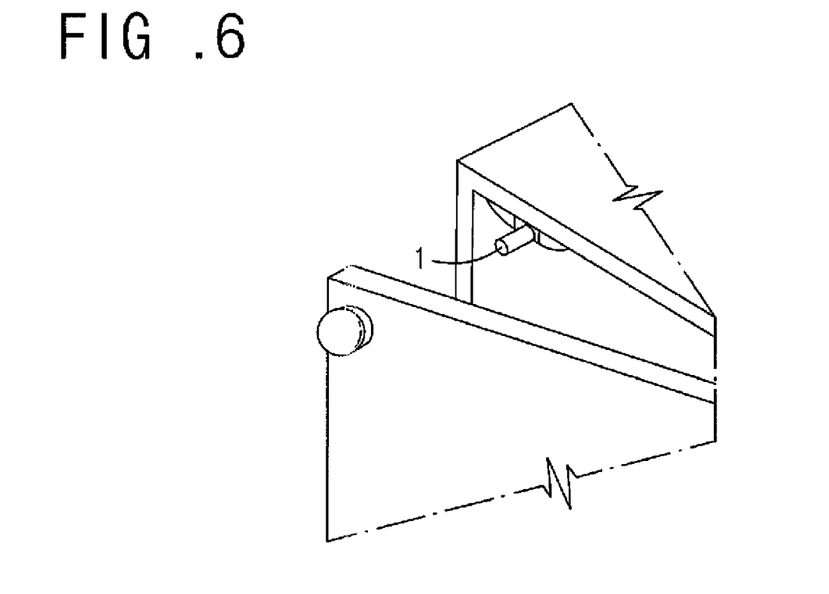
FIG. 6 is a perspective view illustrating the installation state of a door buffering device according to the present invention.

FIGS. 2a and 2b are sectional views illustrating a door buffering device according to a first embodiment of the present invention, FIG. 5 is a perspective view illustrating a protrusion element of a door buffering device according to the present invention, and FIG. 6 is a perspective view illustrating the installation state of a door buffering device according to the present invention.

A device for buffering the closing impact of furniture doors according to the first embodiment of the present invention includes: a cylinder 10 having an oil chamber 11 formed therein; a piston 20 reciprocatingly accommodated in the oil chamber 11 and having a piston rod projecting at one side thereof through an end wall of the cylinder 10, the piston rod being adapted to reciprocate in the oil chamber while passing through a sealing member 21 and a buffer member 22; and a spring 30 accommodated in the oil chamber 11 and having a guide 31 mounted at a front end thereof.

A valve 40 is mounted around the piston rod 23 of the piston 20 in such a fashion that an oil gap 41 is defined between the outer peripheral surface of the valve 40 and the inner peripheral surface of the cylinder 10, the valve having a recessed oil passageway 47 formed on an axial end surface thereof. A protrusion element 50 is integrally formed with a front end portion of the valve 40. The protrusion element 50 has a plurality of oil grooves 51 formed longitudinally on the outer periphery thereof. A check valve 60 is mounted on the outer circumferential surface of the protrusion element 50 in such a fashion as to slidingly reciprocate along the compression direction of oil. Therefore, oil contained in the oil chamber 11 flows through the oil grooves 51 of the protrusion element 50 and then passes through the recessed oil passageway 47 of the valve 40 and the oil gap 41 so as to absorb an external load generated during the closing of the furniture door.

First, the door buffering device 1 according to the present invention includes a cylinder 10, a piston 20 and a spring 30 which are accommodated in the cylinder 10, and a check valve 60 adapted to reciprocate by means of an elastic force of the spring 30.

In this case, the cylinder 10 maintains an opened state at one end thereof to form an opening while maintaining a hermetically sealed state at the other end thereof. The cylinder 10 has an oil chamber 11 formed in an inner space thereof so as to accommodate oil therein.

The piston 20 includes a sealing member 21 mounted at the opening of the cylinder 10 through an O-ring 21a and having a through-hole formed at the central portion thereof, a buffer member 22 adapted to be in close contact with the sealing member 21 and having a through-hole formed at the central portion thereof, and a piston rod 23 adapted to reciprocate along the through-holes of the sealing member 21 and the buffer member 22.

The spring 30 is a typical elastic member that is longitudinally accommodated in the oil chamber 11 and has a disc-like guide 31 mounted at the front end thereof.

The valve 40 is mounted at a front end of the piston rod 23 so that the valve moves along the compression direction of oil together with the piston rod. The valve 40 includes a body portion 45 mounted around the piston rod 23 of the piston 20 in such a fashion that an oil gap 41 is defined between the outer peripheral surface of the body portion 45 and the inner peripheral surface of the cylinder 10 and having a recessed oil passageway 47 formed on an axial end surface thereof, and a protrusion element 50 integrally formed with a front end side of the body portion 45 and having a plurality of oil grooves 51 formed longitudinally on the outer periphery thereof.

The check valve 60 is mounted on the outer circumferential surface of the protrusion element 50 such that it slidingly reciprocates along the compression direction of oil. The check valve 60 is preferably formed of a rigid plastic material, and has a through-hole formed at a central portion thereof so as to define oil passage spaces between the oil grooves 51 of the protrusion element 50 and the inner peripheral surface of the check valve.

Thus, when an external force is applied to the door buffering device 1, the spring 30 is compressed by the guide 31 as much as a pressure corresponding to the external force applied to the piston 20, so that a small quantity of oil in the cylinder 10 flows through the recessed oil passageway 47 of the body portion 45 of the valve 40 via the oil passage spaces defined between the protrusion element 50 and the check valve 60.

On the contrary, when the external force applied to the door buffering device 1 is released, the guide 31 returns to its original position by an elastic restoring force of the spring 30, and simultaneously the small quantity of oil in the cylinder 10 reversely flows toward its original position through the oil gap 41 between the cylinder 10 and the valve 40, the oil passageway 47 of the valve 40, and the oil passage spaces between the protrusion element 50 and the check valve 60 to thereby be maintained in a stable state.

Thus, in this manner, when the external force is exerted to the door buffering device 1, oil travels along the oil passage spaces between the oil grooves 51 of the protrusion element 50 and the inner peripheral surface of the check valve 60, the oil passageway 47 of the valve 40, and the oil gap 41 between the cylinder 10 and the valve 40 in the cylinder 10. On the other hand, when the external force applied to the door buffering device 1 is released, the oil travels in a opposite direction to the above case, i.e., along the oil gap 41 between the cylinder 10 and the valve 40, the oil passageway 47 of the valve 40, and the oil passage spaces between the protrusion element 50 and the check valve 60.

Embodiment 2

Figure 3:
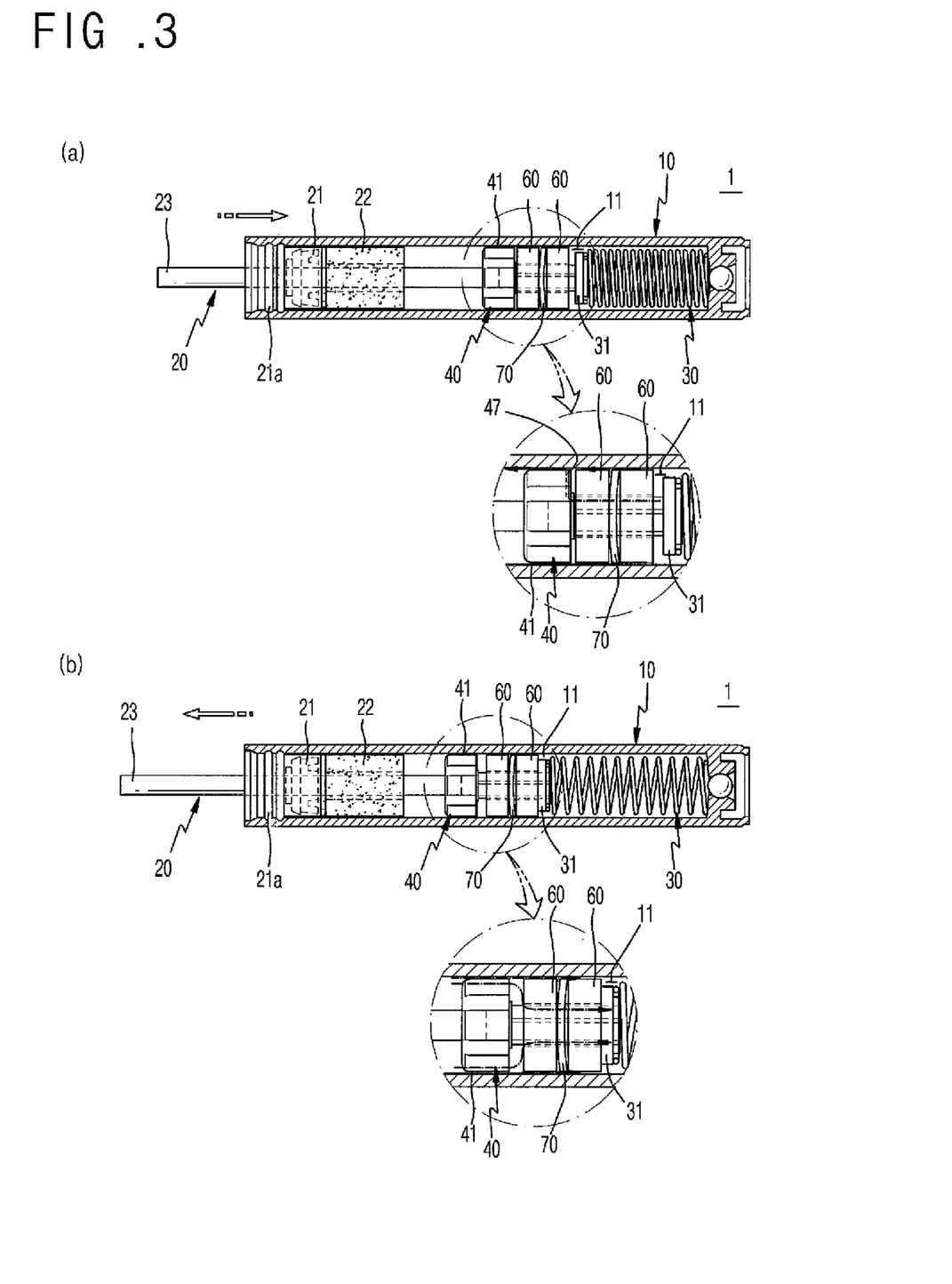
FIGS. 3a and 3b are sectional views illustrating a door buffering device according to a second embodiment of the present invention.

FIGS. 3a and 3b are sectional views illustrating a door buffering device according to a second embodiment of the present invention, FIG. 5 is a perspective view illustrating a protrusion element of a door buffering device according to the present invention, and FIG. 6 is a perspective view illustrating the installation state of a door buffering device according to the present invention.

A device for buffering the closing impact of furniture doors according to the second embodiment of the present invention includes: a cylinder 10 having an oil chamber 11 formed therein; a piston 20 reciprocatingly accommodated in the oil chamber 11 and having a piston rod projecting at one side thereof through an end wall of the cylinder 10, the piston rod being adapted to reciprocate in the oil chamber while passing through a sealing member 21 and a buffer member 22; and a spring 30 accommodated in the oil chamber 11 and having a guide 31 mounted at a front end thereof.

A valve 40 is mounted around the piston rod 23 of the piston 20 in such a fashion that an oil gap 41 is defined between the outer peripheral surface of the valve 40 and the inner peripheral surface of the cylinder 10, the valve having a recessed oil passageway 47 formed on an axial end surface thereof. A protrusion element 50 is integrally formed with a front end portion of the valve 40. The protrusion element 50 has a plurality of oil grooves 51 formed longitudinally on the outer periphery thereof. A check valve 60 and an auxiliary valve 70 are juxtaposedly mounted on the outer circumferential surface of the protrusion element 50 in such a fashion as to slidingly reciprocate along the compression direction of oil. Therefore, oil contained in the oil chamber 11 flows through the oil grooves 51 of the protrusion element 50 and then passes through the recessed oil passageway 47 of the valve 40 and the oil gap 41 so as to absorb an external load generated during the closing of the furniture door.

First, the door buffering device 1 according to the present invention includes a cylinder 10, a piston 20 and a spring 30 which are accommodated in the cylinder 10, and a check valve 60 and an auxiliary valve 70 which are adapted to reciprocate by means of an elastic force of the spring 30.

In this case, the cylinder 10 maintains an opened state at one end thereof to form an opening while maintaining a hermetically sealed state at the other end thereof. The cylinder 10 has an oil chamber 11 formed in an inner space thereof so as to accommodate oil therein.

The piston 20 includes a sealing member 21 mounted at the opening of the cylinder 10 through an O-ring 21a and having a through-hole formed at the central portion thereof, a buffer member 22 adapted to be in close contact with the sealing member 21 and having a through-hole formed at the central portion thereof, and a piston rod 23 adapted to reciprocate along the through-holes of the sealing member 21 and the buffer member 22.

The spring 30 is a typical elastic member that is longitudinally accommodated in the oil chamber 11 and has a disc-like guide 31 mounted at the front end thereof.

The valve 40 is mounted at a front end of the piston rod 23 so that the valve moves along the compression direction of oil together with the piston rod. The valve 40 includes a body portion 45 mounted around the piston rod 23 of the piston 20 in such a fashion that an oil gap 41 is defined between the outer peripheral surface of the body portion 45 and the inner peripheral surface of the cylinder 10 and having a recessed oil passageway 47 formed on an axial end surface thereof, and a protrusion element 50 integrally formed with a front end side of the body portion 45 and having a plurality of oil grooves 51 formed longitudinally on the outer periphery thereof.

The check valve 60 is mounted on the outer circumferential surface of the protrusion element 50 such that it slidingly reciprocates along the compression direction of oil. The check valve 60 is preferably formed of a rigid plastic material, and has a through-hole formed at a central portion thereof so as to define oil passage spaces between the oil grooves 51 of the protrusion element 50 and the inner peripheral surface of the check valve.

Also, the auxiliary valve 70 is mounted on the outer circumferential surface of the protrusion element 50 such that it slidingly reciprocates along the compression direction of oil along with the check valve 60. The auxiliary valve 70 is preferably formed of a soft plastic material, and has a through-hole formed at a central portion thereof so as to define oil passage spaces between the oil grooves 51 of the protrusion element 50 and the inner peripheral surface of the auxiliary valve.

Thus, when an external force is applied to the door buffering device 1, the spring 30 is compressed by the guide 31 as much as a pressure corresponding to the external force applied to the piston 20, so that a small quantity of oil in the cylinder 10 flows through the recessed oil passageway 47 of the body portion 45 of the valve 40 via the oil passage spaces defined between the protrusion element 50 and the check valve 60/the auxiliary valve 70.

On the contrary, when the external force applied to the door buffering device 1 is released, the guide 31 returns to its original position by an elastic restoring force of the spring 30, and simultaneously the small quantity of oil in the cylinder 10 reversely flows toward its original position through the oil gap 41 between the cylinder 10 and the valve 40, the oil passageway 47 of the valve 40, and the oil passage spaces between the protrusion element 50 and the check valve 60/the auxiliary valve 70 to thereby be maintained in a stable state.

Thus, in this manner, when the external force is exerted to the door buffering device 1, oil travels along the oil passage spaces between the oil grooves 51 of the protrusion element 50 and the inner peripheral surfaces of the check valve 60/the auxiliary valve 70, the oil passageway 47 of the valve 40, and the oil gap 41 between the cylinder 10 and the valve 40 in the cylinder 10. On the other hand, when the external force applied to the door buffering device 1 is released, the oil travels in an opposite direction to the above case, i.e., along the oil gap 41 between the cylinder 10 and the valve 40, the oil passageway 47 of the valve 40, and the oil passage spaces between the protrusion element 50 and the check valve 60/the auxiliary valve 70.

Embodiment 3

Figure 4:
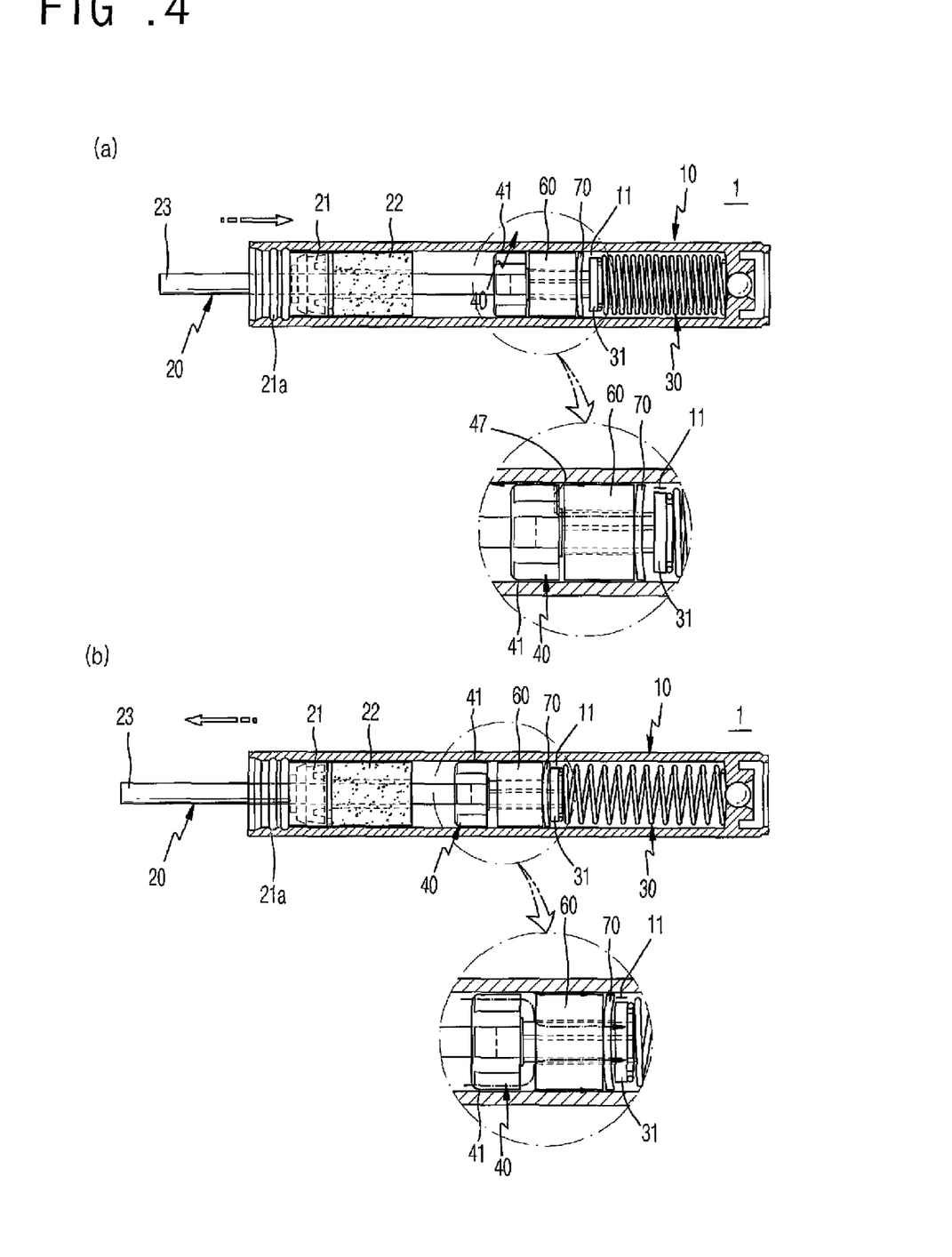
FIGS. 4a and 4b are sectional views illustrating a door buffering device according to a third embodiment of the present invention.

FIGS. 4a and 4b are sectional views illustrating a door buffering device according to a third embodiment of the present invention, FIG. 5 is a perspective view illustrating a protrusion element of a door buffering device according to the present invention, and FIG. 6 is a perspective view illustrating the installation state of a door buffering device according to the present invention.

A device for buffering the closing impact of furniture doors according to the third embodiment of the present invention includes: a cylinder 10 having an oil chamber 11 formed therein; a piston 20 reciprocatingly accommodated in the oil chamber 11 and having a piston rod projecting at one side thereof through an end wall of the cylinder 10, the piston rod being adapted to reciprocate in the oil chamber while passing through a sealing member 21 and a buffer member 22; and a spring 30 accommodated in the oil chamber 11 and having a guide 31 mounted at a front end thereof.

A valve 40 is mounted around the piston rod 23 of the piston 20 in such a fashion that an oil gap 41 is defined between the outer peripheral surface of the valve 40 and the inner peripheral surface of the cylinder 10, the valve having a recessed oil passageway 47 formed on an axial end surface thereof. A protrusion element 50 is integrally formed with a front end portion of the valve 40. The protrusion element 50 has a plurality of oil grooves 51 formed longitudinally on the outer periphery thereof. A pair of check valves 60 mounted on the outer circumferential surface of the protrusion element 50 in such a fashion as to slidingly reciprocate along the compression direction of oil. And, at least one auxiliary valve 70 is interposed between the check valves 60. Therefore, oil contained in the oil chamber 11 flows through the oil grooves 51 of the protrusion element 50 and then passes through the recessed oil passageway 47 of the valve 40 and the oil gap 41 so as to absorb an external load generated during the closing of the furniture door.

First, the door buffering device 1 according to the present invention includes a cylinder 10, a piston 20 and a spring 30 which are accommodated in the cylinder 10, and a pair of check valves 60 and an auxiliary valve 70 which are adapted to reciprocate by means of an elastic force of the spring 30.

In this case, the cylinder 10 maintains an opened state at one end thereof to form an opening while maintaining a hermetically sealed state at the other end thereof. The cylinder 10 has an oil chamber 11 formed in an inner space thereof so as to accommodate oil therein.

The piston 20 includes a sealing member 21 mounted at the opening of the cylinder 10 through an O-ring 21a and having a through-hole formed at the central portion thereof, a buffer member 22 adapted to be in close contact with the sealing member 21 and having a through-hole formed at the central portion thereof, and a piston rod 23 adapted to reciprocate along the through-holes of the sealing member 21 and the buffer member 22.

The spring 30 is a typical elastic member that is longitudinally accommodated in the oil chamber 11 and has a disc-like guide 31 mounted at the front end thereof.

The valve 40 is mounted at a front end of the piston rod 23 so that the valve moves along the compression direction of oil together with the piston rod. The valve 40 includes a body portion 45 mounted around the piston rod 23 of the piston 20 in such a fashion that an oil gap 41 is defined between the outer peripheral surface of the body portion 45 and the inner peripheral surface of the cylinder 10 and having a recessed oil passageway 47 formed on an axial end surface thereof, and a protrusion element 50 integrally formed with a front end side of the body portion 45 and having a plurality of oil grooves 51 formed longitudinally on the outer periphery thereof.

The check valves 60 are mounted on the outer circumferential surface of the protrusion element 50 such that it slidingly reciprocates along the compression direction of oil. The check valves 60 are preferably formed in at least one pair, which are spaced apart from each other at a certain interval on the outer circumferential surface of the protrusion element 50. Each check valve 60 is preferably formed of a rigid plastic material, and has a through-hole formed at a central portion thereof so as to define oil passage spaces between the oil grooves 51 of the protrusion element 50 and the inner peripheral surface of the check valve.

Also, the auxiliary valve 70 is mounted on the outer circumferential surface of the protrusion element 50 such that it slidingly reciprocates along the compression direction of oil along with the check valve 60. The auxiliary valve 70 is preferably formed of a soft plastic material, and has a through-hole formed at a central portion thereof so as to define oil passage spaces between the oil grooves 51 of the protrusion element 50 and the inner peripheral surface of the auxiliary valve.

In this case, the auxiliary valve 70 is preferably mounted between the check valves 60 so as to maximize efficiency of a buffering action.

Of course, each of the check valves 60 and the auxiliary valve 70 may be formed in pair in such a fashion as to be sequentially arranged.

Thus, when an external force is applied to the door buffering device 1, the spring 30 is compressed by the guide 31 as much as a pressure corresponding to the external force applied to the piston 20, so that a small quantity of oil in the cylinder 10 flows through the recessed oil passageway 47 of the body portion 45 of the valve 40 via the oil passage spaces defined between the protrusion element 50 and the check valves 60/the auxiliary valve 70.

On the contrary, when the external force applied to the door buffering device 1 is released, the guide 31 returns to its original position by an elastic restoring force of the spring 30, and simultaneously the small quantity of oil in the cylinder 10 reversely flows toward its original position through the oil gap 41 between the cylinder 10 and the valve 40, the oil passageway 47 of the valve 40, and the oil passage spaces between the protrusion element 50 and the check valves 60/the auxiliary valve 70 to thereby be maintained in a stable state.

Thus, in this manner, when the external force is exerted to the door buffering device 1, oil travels along the oil passage spaces between the oil grooves 51 of the protrusion element 50 and the inner peripheral surfaces of the check valves 60/the auxiliary valve 70, the oil passageway 47 of the valve 40, and the oil gap 41 between the cylinder 10 and the valve 40 in the cylinder 10. On the other hand, when the external force applied to the door buffering device 1 is released, the oil travels in a opposite direction to the above case, i.e., along the oil gap 41 between the cylinder 10 and the valve 40, the oil passageway 47 of the valve 40, and the oil passage spaces between the protrusion element 50 and the check valves 60/the auxiliary valve 70.

INDUSTRIAL APPLICABILITY

As described above, the device for buffering the closing impact of furniture doors of the present invention has an advantageous effect in that a door buffering device having a dual oil passageway is mounted in an opening/closing path of a furniture door so that a collision noise generated during the closing of the door is minimized to create a noiseless indoor environment as well as secure stability at the time of closing the door, thereby lengthening the lifespan of the furniture and the door buffering device.

In addition, the device for buffering the closing impact of furniture doors of the present invention has another advantageous effect in that a door buffering device having a single spring is mounted in the opening/closing path of the furniture door so that the number of constitutional parts of the door buffering device is minimized, the manufacturing cost is reduced, and reliability of the product is improved.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A device for buffering the closing impact of furniture doors, comprising:
   a cylinder (10) having an oil chamber (11) formed therein;
   a piston (20) reciprocally accommodated in the oil chamber (11) and having a piston rod projecting at one side thereof through an end wall of the cylinder (10), the piston rod being adapted to reciprocate in the oil chamber while passing through a sealing member (21) and a buffer member (22);
   a spring (30) accommodated in the oil chamber (11) and having a guide (31) mounted at a front end thereof;
   a valve (40) including a body portion (45) and a protrusion element (50), the body portion being mounted around the piston rod (23) of the piston (20) in such a fashion that an oil gap (41) is defined between the outer peripheral surface of the body portion (45) and the inner peripheral surface of the cylinder (10) and having a recessed oil passageway (47) formed on an axial end surface thereof, and the protrusion element being integrally formed with a front end side of the body portion (45) and having a plurality of oil grooves (51) formed longitudinally on the outer periphery thereof; and
   a check valve (60) mounted on the outer circumferential surface of the protrusion element (50) in such a fashion as to slidingly reciprocate along the compression direction of oil,
   whereby when an external load is exerted to the piston (20), the check valve (60) moves along with the protrusion element (50) and simultaneously oil contained in the oil chamber (11) flows through the recessed oil passageway (47) of the valve (40) and the oil gap (41) via the oil grooves (51) defined between the protrusion element (50) and the check valve (60) to thereby absorb an impact generated during the closing of the furniture door.

2. A device for buffering the closing impact of furniture doors, comprising:
   a cylinder (10) having an oil chamber (11) formed therein;
   a piston (20) reciprocally accommodated in the oil chamber (11) and having a piston rod projecting at one side thereof through an end wall of the cylinder (10), the piston rod being adapted to reciprocate in the oil chamber while passing through a sealing member (21) and a buffer member (22);
   a spring (30) accommodated in the oil chamber (11) and having a guide (31) mounted at a front end thereof;
   a valve (40) including a body portion (45) and a protrusion element (50), the body portion being mounted around the piston rod (23) of the piston (20) in such a fashion that an oil gap (41) is defined between the outer peripheral surface of the body portion (45) and the inner peripheral surface of the cylinder (10) and having a recessed oil passageway (47) formed on an axial end surface thereof, and the protrusion element being integrally formed with a front end side of the body portion (45) and having a plurality of oil grooves (51) formed longitudinally on the outer periphery thereof; and
   a check valve (60) and an auxiliary valve (70) juxtaposedly mounted on the outer circumferential surface of the protrusion element (50) in such a fashion as to slidingly reciprocate along the compression direction of oil,
   whereby when an external load is exerted to the piston (20), the check valve (60) and the auxiliary valve (70) move along with the protrusion element (50) and simultaneously oil contained in the oil chamber (11) flows through the recessed oil passageway (47) of the valve (40) and the oil gap (41) via the oil grooves (51) defined between the protrusion element (50) and the check valve (60)/the auxiliary valve (70) to thereby absorb an impact generated during the closing of the furniture door.

3. A device for buffering the closing impact of furniture doors, comprising:
   a cylinder (10) having an oil chamber (11) formed therein;
   a piston (20) reciprocally accommodated in the oil chamber (11) and having a piston rod projecting at one side thereof through an end wall of the cylinder (10), the piston rod being adapted to reciprocate in the oil chamber while passing through a sealing member (21) and a buffer member (22);
   a spring (30) accommodated in the oil chamber (11) and having a guide (31) mounted at a front end thereof;
   a valve (40) including a body portion (45) and a protrusion element (50), the body portion being mounted around the piston rod (23) of the piston (20) in such a fashion that an oil gap (41) is defined between the outer peripheral surface of the body portion (45) and the inner peripheral surface of the cylinder (10) and having a recessed oil passageway (47) formed on an axial end surface thereof, and the protrusion element being integrally formed with a front end side of the body portion (45) and having a plurality of oil grooves (51) formed longitudinally on the outer periphery thereof; and
   a pair of check valves (60) mounted on the outer circumferential surface of the protrusion element (50) in such a fashion as to slidingly reciprocate along the compression direction of oil, and at least one auxiliary valve (70) interposed between the pair of check valves (60),
   whereby when an external load is exerted to the piston (20), the check valves (60) and the auxiliary valve (70) move along with the protrusion element (50) and simultaneously oil contained in the oil chamber (11) flows through the recessed oil passageway (47) of the valve (40) and the oil gap (41) via the oil grooves (51) defined between the protrusion element (50) and the check valves (60)/the auxiliary valve (70) to thereby absorb an impact generated during the closing of the furniture door.

* * * * *